July 24, 1962 D. E. MARSHALL, JR 3,046,490

SYNCHRONIZED OSCILLATOR CONTROL SYSTEM

Filed Aug. 13, 1959

INVENTOR.
DONALD E. MARSHALL, JR.
BY
Fordyce A. Bothwell
ATTORNEY 3,046,490

SYNCHRONIZED OSCILLATOR CONTROL SYSTEM

Donald E. Marshall, Jr., Broomall, Pa., assignor, by mesne assignments, to Philco Corporation, Philadelphia, Pa., a corporation of Delaware Filed Aug. 13, 1959, Ser. No. 833,446
9 Claims. (Cl. 331—1)

Figure 1:
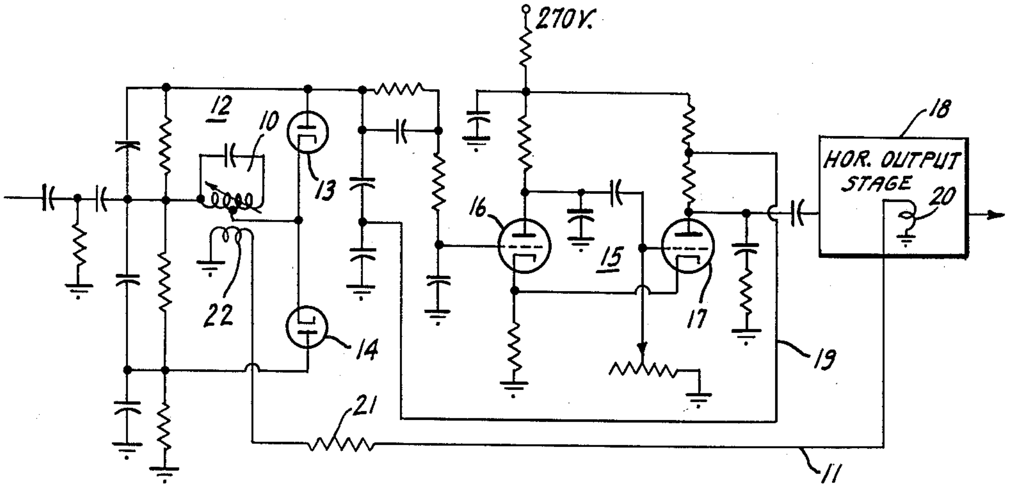

This invention relates to the control of synchronized oscillators, and more particularly it relates to the type of system which includes both frequency and phase control, as employtd, for example, in horizontal synchronizing systems of television receivers.

As is well understood in the art, both frequency and phase control of a synchronized oscillator are desirable in order to provide good pull-in and lock-in actions under noise conditions normally encountered in practice. In the past, therefore, some oscillator control systems have employed two feedback loops—an automatic frequency control loop for pull-in control and an automatic phase control loop for lock-in control. Since this type of system is well known, a detailed description thereof is unnecessary. It suffices to state that in the past this type of system has involved independent devices for frequency and phase control, one a frequency detector or discriminator device for controlling the oscillator in response to frequency deviations of the oscillator output signal with reference to the frequency of the input signal, and the other a phase detector device for controlling the oscillator in response to phase deviations of the oscillator output signal with reference to the phase of the input signal. Prior systems of this type have therefore been relatively complicated and costly.

In horizontal synchronizing systems for television receivers, to which the present invention is particularly applicable, the practice has been to rely mainly on automatic phase control and to provide a stabilizing coil in the oscillator, as well as the usual horizontal hold control. Prior systems of the type employing two feedback loops have been regarded as too complicated and too costly.

The principal object of the present invention is to provide a relatively simple and inexpensive system which employs two feedback loops for both phase and frequency control and which is particularly well adapted for use in the horizontal synchronizing system of a television receiver.

This invention is based on the novel concept of utilizing certain circuit components for both phase and frequency control, thereby effecting simplification and reduction of cost. Based on this concept, experimental work has shown that it is possible greatly to simplify a two-loop phase—frequency control system, and consequently it is possible to effect substantial cost reduction without adverse effect upon the operation.

A system according to the present invention comprises an oscillator to be synchronized with an input signal, combined phase and frequency control means for maintaining the phase and frequency of the oscillator output signal identical to the phase and frequency of said input signal, said control means including a pair of diodes and at least one tuned circuit arranged to serve for both phase and frequency control of the oscillator, means for supplying the input signal and the oscillator output signal to said control means for phase control of the oscillator, and means for supplying to said control means a third signal resulting from operation of the oscillator to effect frequency control of the oscillator.

The invention may be fully understood from the following detailed description with reference to the accompanying drawing, wherein—

Figure 2:
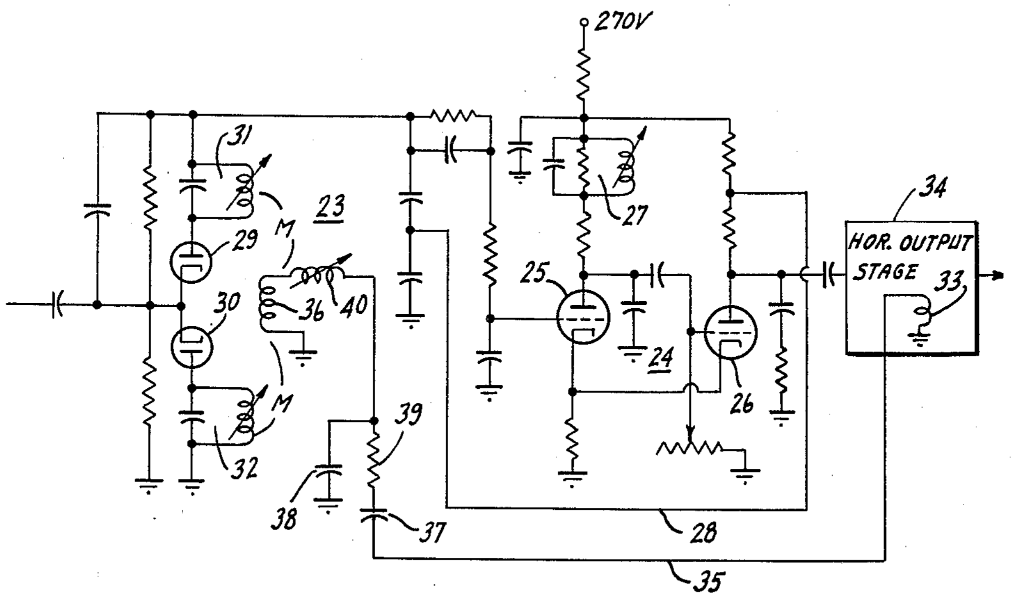

FIG. 1 is a schematic diagram of a preferred embodiment of the invention as applied to a horizontal synchronizing system of a television receiver; and FIG. 2 is a similar diagram of an alternative embodiment of the invention.

Referring first to FIG. 1, there is shown a horizontal synchronizing system according to this invention as it was actually embodied and successfully operated in a television receiver. Assuming for the moment the omission of the tuned circuit 10 and the feedback loop 11, the system corresponds to that employed, for example, in Philco television receiver models TV–390 and 8L71 manufactured and sold by the assignee of the present application, except that the usual stabilizing tuned circuit is omitted. In this system a balanced phase detector 12, including a pair of diodes 13 and 14, serves to compare the phase of the output signal of oscillator 15 with the phase of the incoming horizontal synchronizing signal and to provide the lock-in control of the oscillator. In the system illustrated, the oscillator is a multivibrator including triodes 16 and 17, which supplies a sawtooth driving signal to the conventional horizontal output stage represented at 18.

Phase control of the oscillator 15 is effected by application of control voltage to the grid of tube 16. Sawtooth signal is fed back from the plate circuit of tube 17 by way of the feedback loop 19 and appears across the diodes 13 and 14 in opposite phase. The horizontal synchronizing pulses, which have been separated from the composite signal, are supplied to both diodes and the circuit functions to compare the phase of the fed back sawtooth signal with the phase of the synchronizing pulses, as well understood in the art. As long as the phase of the sawtooth signal is correct, a balanced condition obtains and no phase-control voltage is applied to the grid of tube 16. However, whenever the phase of the sawtooth signal changes in one direction or the other the detector circuit becomes unbalanced accordingly and applies a control voltage to the grid of tube 16 to restore the correct phase of the sawtooth output of the oscillator.

Now in accordance with the present invention, the detector 12 is effectively converted to a combined frequency and phase control device so that it serves both for pull-in and lock-in. In the preferred embodiment illustrated in FIG. 1, a high-Q tuned circuit 10 is provided as shown and is tuned to the frequency of the incoming signal, i.e. the horizontal synchronizing signal, and a feedback loop 11 is providtd for supplying to said tuned circuit a signal resulting from operation of the oscillator. Preferably, the horizontal flyback pulses are derived from the output transformer in the output stage 18 by placing thereon an auxiliary winding (represented at 20) consisting of a few turns, and the derived horizontal flyback pulses are supplied by way of feedback loop 11 through a resistor 21 to a coil 22 inductively associated with the tuned circuit 10. The tuned circuit is thus shock excited by the flyback pulses and producers a sine wave voltage which is applied across each diode in the same phase.

The frequency control action of this system involves frequency comparison of the sawtooth voltages across the diodes with the sine wave voltage, there being a quadrature relationship between the sine wave and the fundamental component of the sawtooth waveform. When the sawtooth output of the oscillator is of correct frequency, no frequency control action occurs. However, when the oscillator drifts in frequency, a frequency corrective action is exerted by application of a control voltage to the grid of tube 16.

It is known that a balanced detector can be employed for frequency comparison of sawtooth and sine wave voltages. The novel feature here is that a dual-purpose detector is provided for both frequency and phase control of an oscillator in a system having two feedback loops. Experimental use of this system for control of horizontal deflection in a television receiver has demonstrated its capability of simultaneously performing both control functions. The resonant circuit presents negligible impedance to the synchronizing pulses which are composed of frequency components much higher than the oscillator frequency, and therefore the resonant circuit does not affect the phase detection action. Moreover it has been found that the frequency control in the system of FIG. 1 is so effective that it is possible to dispense with the usual stabilizing tuned circuit in the oscillator.

By way of example, in one application of the FIG. 1 embodiment of this invention to a Philco television receiver model 8L71, the tuned circuit 10 comprises an inductance of 12 millihenries and a capacitance of .0082 microfarad.

Referring now to FIG. 2, there is shown a modified form of the same system wherein a combined phase and frequency detector 23 serves to control the oscillator 24 which is a multivibrator having tubes 25 and 26. The system shown in FIG. 2 was also embodied and successfully operated in a television receiver. In this system the oscillator 24 is identical with that of FIG. 1 except that the stabilizing tuned circuit 27 is included in the plate circuit of tube 25, the purpose being to stabilize the frequency of the oscillator.

Insofar as phase control is concerned, the system of FIG. 2 is similar to that of FIG. 1 and operates in the same manner. Sawtooth signal is fed back from the plate circuit of tube 26 by way of feedback loop 28 and appears in opposite phase across the diodes 29 and 30. The horizontal synchronizing pulses are supplied to the diodes and the circuit functions in the manner previously described with reference to FIG. 1 to control the phase of the sawtooth output of the oscillator 24.

As regards frequency control, however, the system of FIG. 2 is specifically different from that of FIG. 1. A discriminator arrangement is provided in FIG. 2 including the two diodes and two high-Q tuned circuits 31 and 32 which are tuned respectively to frequencies above and below the horizontal synchronizing frequency. Assuming the standard horizontal frequency of 15,750 cycles per second, the tuned circuits may be tuned respectively to frequencies 500 cycles above and below, i.e. 16,250 and 15,250 cycles per second. The horizontal flyback pulses are derived from winding 33 within output stage 34, as in FIG. 1, and are fed back by way of feedback loop 35 to a primary circuit including coil 36 which has equal inductive coupling with the tuned circuits 31 and 32. The feedback circuit also includes capacitors 37 and 38, resistor 39, and variable inductor 40.

The type of frequency discriminator here involved is well known in the art. In this instance a sine wave derived from the flyback pulses is of the same frequency as the sawtooth output of the oscillator. As long as that frequency is of the correct value the discriminator is balanced and no frequency control action takes place. However, whenever the oscillator drifts the discriminator becomes unbalanced and frequency control action takes place to restore the proper frequency.

Here again the novel feature is that a dual-purpose detector is provided for both frequency and phase control of an oscillator in a system having two feedback loops.

By way of example in one application of the FIG. 2 embodiment of this invention to a Philco television receiver model 8L71, the added components have the following values:

Tuned circuits 31 and 32—inductance 10 millihenries, capacitance .01 microfarad
Winding 36—400 microhenries
Capacitor 37—.05 microfarad Capacitor 38—2200 microfarads
Resistor 39—150K, 1 watt
Inductor 40—40 millihenries.

While certain embodiments of the invention have been illustrated and described, it is to be understood that the invention is not limited thereto but contemplates such modifications and further embodiments as may occur to those skilled in the art.

I claim:

1. In an automatic phase and frequency control system, an oscillator to be synchronized with an input signal, combined phase and frequency control means for maintaining the phase and frequency of the oscillator output signal identical to the phase and frequency of said input signal, said control means including a pair of diodes and at least one tuned circuit arranged to serve for both phase and frequency control of the oscillator, means for supplying the input signal and the oscillator output signal to said control means for phase control of the oscillator, and means for supplying to said control means a third signal resulting from operation of the oscillator to effect frequency control of the oscillator.

2. An automatic phase and frequency control system according to claim 1, wherein said control means includes a single high-Q tuned circuit common to said diodes and tuned to the normal frequency of the oscillator.

3. An automatic phase and frequency control system according to claim 1, wherein said control means includes a pair of tuned circuits connected respectively to said diodes and tuned respectively to predetermined frequencies above and below the normal frequency of the oscillator.

4. In a horizontal synchronizing system for a television receiver, an oscillator to be synchronized with the horizontal synchronizing signal and adapted to produce a sawtooth signal, a horizontal output stage wherein flyback pulses are produced, means for supplying said sawtooth signal to said output stage, combined phase and frequency control means for maintaining the phase and frequency of the oscillator output signal identical to the phase and frequency of the horizontal synchronizing signal, said control means including a pair of diodes and at least one tuned circuit arranged to serve for both phase and frequency control of the oscillator, means for supplying the horizontal synchronizing signal and the oscillator output signal to said control means for phase control of the oscillator, means for deriving said flyback pulses from said output stage, and means for supplying the derived flyback pulses to said control means to effect frequency control of the oscillator.

5. A horizontal synchronizing system according to claim 4, wherein said control means includes a single tuned circuit common to said diodes and tuned to the normal frequency of the oscillator.

6. A horizontal synchronizing system according to claim 4, wherein said control means includes a pair of tuned circuits connected respectively to said diodes and tuned respectively to predetermined frequencies above and below the normal frequency of the oscillator.

7. A balanced phase and frequency detector, comprising a pair of diodes connected in opposed relation and a pair of load impedances connected respectively across the diodes, a reference signal input connection to said diodes, a connection for applying across said diodes in opposite phase a signal whose phase and frequency are to be determined with reference to said reference signal, a tuned circuit connected so as to be common to said diodes, said circuit being tuned to the frequency of said reference signal, means for supplying energy to said tuned circuit to cause the latter to produce a sine wave voltage for frequency comparison with the signal applied across said diodes in opposite phase, and means for deriving output voltage from across said load impedances.

8. A balanced phase and frequency detector, comprising a pair of diodes connected in opposed relation and a pair of load impedances connected respectively across the diodes, a reference signal input connection to said diodes, a connection for applying across said diodes in opposite phase a signal whose phase and frequency are to be determined with reference to said reference signal, a pair of tuned circuits connected respectively in circuit with said diodes, said circuits being tuned respectively to frequencies above and below the frequency of said reference signal, means for inductively subjecting said circuits to a sine wave voltage having the same frequency as the signal applied across said diodes in opposite phase, and means for deriving output voltage from across said load impedances.

9. In a deflection synchronizing system for a television receiver, an oscillator to be synchronized with a received synchronizing signal and adapted to produce a sawtooth signal, combined phase and frequency control means connected to said oscillator to control the same and including a pair of diodes and at least one tuned circuit, means for supplying the received synchronizing signal to said diodes, a first feedback loop for supplying said sawtooth signal to said diodes in opposite phase for automatic phase control of said oscillator, and a second feedback loop for supplying to said tuned circuit a signal resulting from the operation of said oscillator to produce a sine wave for automatic frequency control of said oscillator.

References Cited in the file of this patent

UNITED STATES PATENTS

| | | |
|---|---|---|
| 2,243,202 | Fritz | May 27, 1941 |
| 2,610,297 | Leed | Sept. 9, 1952 |
| 2,742,591 | Procter | Apr. 17, 1956 |
| 2,849,612 | Court | Aug. 26, 1958 |
| 2,877,379 | Default | Mar. 10, 1959 |